June 1, 1926.
C. W. WYMAN
1,587,461
MINING APPARATUS
Original Filed April 10, 1922
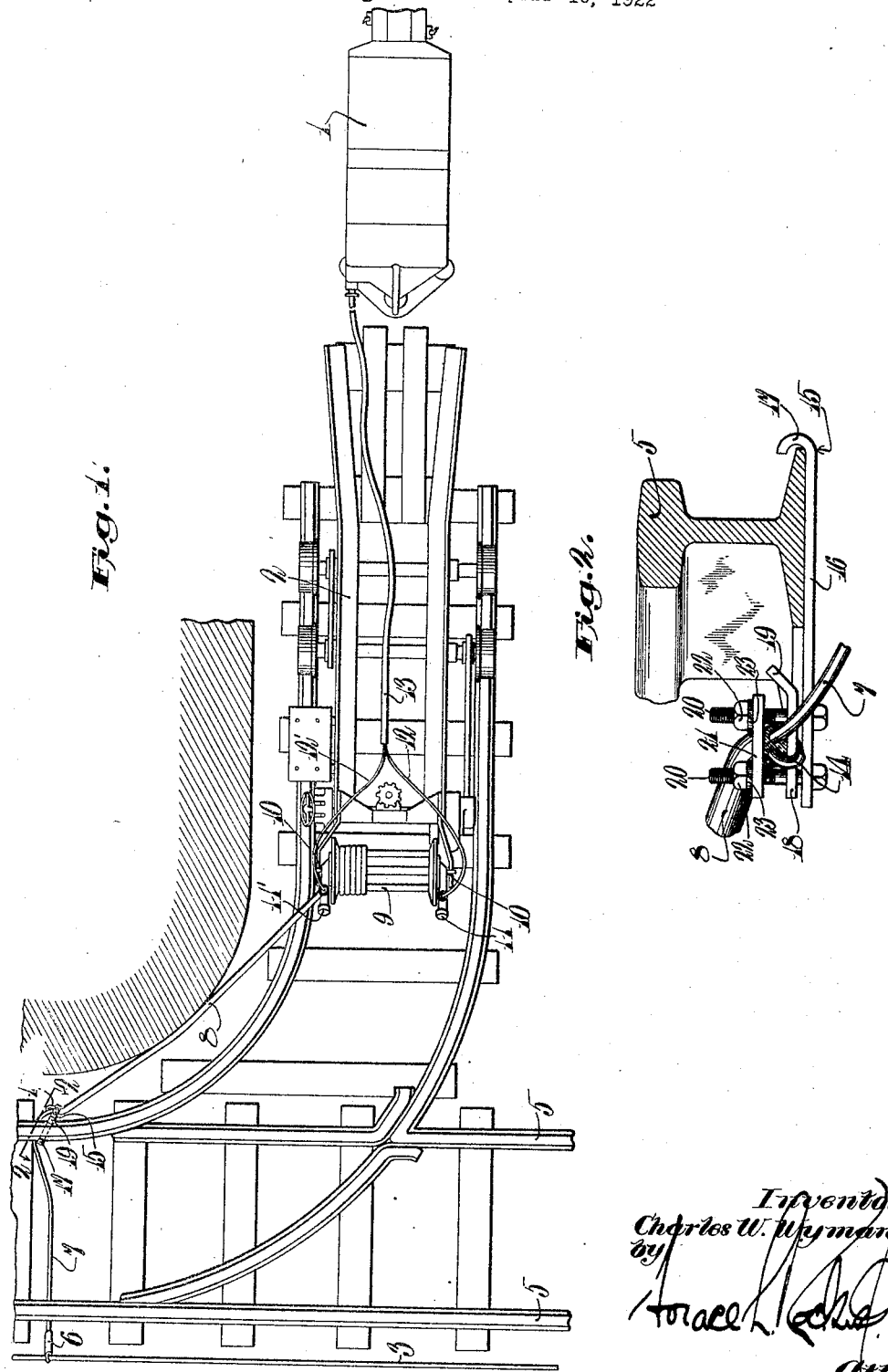
Inventor:
Charles W. Wyman.
by
Atty.

Patented June 1, 1926.

1,587,461

UNITED STATES PATENT OFFICE.

CHARLES W. WYMAN, OF CLAREMONT, NEW HAMPSHIRE, ASSIGNOR TO SULLIVAN MACHINERY COMPANY, A CORPORATION OF MASSACHUSETTS.

MINING APPARATUS.

Application filed April 10, 1922, Serial No. 551,387. Renewed June 4, 1923.

My invention relates to mining apparatus and more particularly to improved means for use with the electric system of such apparatus.

It has for one of its objects to provide an improved wiring system for mining machines of the electric type. Another object is to provide an improved combined cable clamp ground member for use in the wiring system of such machines. A further object of my invention is to provide an improved device for taking the strain off of the trolley wire when an electric mining machine is being used in a room and at a point remote from the entry. Other objects of my invention will hereinafter more fully appear.

In the accompanying drawings I have shown for purposes of illustration one form which my invention may assume in practice, this form being simplified for purposes of illustration.

In these drawings,—

Fig. 1 is a plan view of a mining mechanism in connection with which my invention is being employed.

Fig. 2 is a perspective view corresponding to the section line 2—2 of Fig. 1.

In the illustrative embodiment of my invention I have shown a mining machine 1 of a usual electrically driven type adapted to move relative to the mine bottom during cutting and to be carried upon a wheeled truck 2 likewise of usual construction. This machine during cutting and transportation is supplied with current from a trolley wire 3 arranged usually above and to one side of the tracks 5. As shown, current is supplied from the trolley wire 3 to the machine through any suitable contact or connector, herein in the form of a trolley clip 6, and a conductor 7 electrically connected to the machine as hereinafter described, the clip during cutting, that is, when the machine is removed from the truck, being adapted to be attached to the trolley wire and during transport, that is, when the machine is on the truck, being adapted to be held by the operator in sliding engagment with the trolley wire. In a machine of the room-and-pillar type shown, the conductor 7 is included in a cable 8 which is in turn wound upon a suitable rotatable reel 9 mounted at 10 on the rear end of the track and provided with connector plugs 11, 11′ which are in turn connected to separate conductors 12, 12′ later united in a single machine cable 13 of suitable length and leading to the machine, a ground return being provided through the cable 13 to conductor 12′, connector plug 11′, the cable 8, and by way of a conductor 14 which is disposed within the cable 8. The conductor 14 is metallically connected to a track clamp 15 which I will more fully describe, and the latter makes a ground connection with one of the rails 5.

It will be understood that if suitable means is not provided to take the strain which may be imposed upon the trolley wire by tension upon the cable 8 there will be a possibility of either pulling loose a portion of the trolley wire or with some form of trolley clips pulling the latter off of the trolley wire, the latter event necessitating the stopping of the machine and the return of the operator or his helper to replace the clip. To prevent this contingency and to provide a more practical grounding connection I have devised the improved track clamp 15. This clamp includes a bottom member 16 having a hook 17 formed at one end thereof, and to the opposite end of the member 16 is bolted a short section 18 having an angularly disposed end 19 arranged opposite the hook 17, the ends of the hook 17 and member 19 being spaced apart a distance greater than the width of the base of one of the track rails. A pair of bolts 20 pass through holes in the member 16 and the member 18 and through a clamping plate 21, suitable nuts 22 and washers 23 enabling the tightening down of the parts. The end of the cable 8 is passed through between the plate member 18 and the clamping plate 21 and end of the conductor 14 which has been stripped of its insulation is inserted between the member 16 and the member 18. The nuts 22 are then tightened down, clamping the cable 8 between the members 18 and 21 and tightly clamping the end of the member 14 between the plates 16 and 18. The cable 7 which is also sheathed within the cable 8 extends an adequate distance beyond the clamps to permit attachment to the trolley wire 3 by means of the clip 6.

The mode of operation of this mechanism will be readily apparent. When the machine reaches a room which it is desired to enter, the clamp 15 is placed beneath a rail and canted about a vertical axis to a position corresponding to that shown in the drawings. The trolley clip 6 is hooked or otherwise secured to the trolley wire 3. The cable 8 then maintains the clamp 15 in its canted position and tightly locks the clamp upon the rail, there being no possible slipping as long as the tension is maintained, the pull upon the cable as the machine enters the room maintaining a good contact between the rail and the clamping member 15. Upon leaving the room, by moving the member 15 about a vertical axis to a position perpendicular to the track, it may be readily detached and the machine can then proceed to another point, the operator holding the clip 6 in contact with the trolley wire. It will thus be noted that the connection shown is capable of being attached very quickly and removed very quickly from the rail in such manner as to expedite the operation of the machine, no clamping or screwing adjustments ordinarily being necessary after the cable and its conductor have been properly connected in the clamp, save the occasional tightening of the nuts which is to be expected. Moreover, it will be noted that in the arrangement shown in Fig. 1, a construction is provided which reduces to a minimum the chances of conflict between the machine and the cable, all of the conductors being so disposed as to be out of the path of the machine and the grounding connection further being such as to permit free passage of other machines or cars along the main entry from which the lateral passage or room neck extends as shown.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A quick connectable grounding device for electric cables having engaging portions normally spaced apart a greater distance than the width of the member to be engaged thereby and movable bodily about a vertical axis into holding position.

2. A quick releasable grounding device for electric cables having oppositely located engaging portions normally spaced apart a distance greater than the width of the member to be engaged thereby and movable bodily about a vertical axis into releasing position.

3. A quick connectable and releasable grounding device for electric cables under tension having oppositely located engaging portions normally spaced apart a greater distance than the width of the member to be engaged thereby and movable bodily in opposite directions into its holding and releasing positions upon said member.

4. A quick connectable and releasable rail engaging grounding device for electric cables under tension having oppositely located rail engaging portions normally spaced apart a distance greater than the width of the rail on which the cable is to be grounded and movable bodily in opposite directions to holding and releasing positions.

5. A grounding device for electric cables including means having oppositely extending hook-like portions normally spaced apart a distance greater than the width of a member to be engaged thereby and movable bodily about a vertical axis, and a connection between said cable and said means at a point adjacent one end of the latter.

6. A grounding device for electric cables including means having oppositely extending hook-like portions normally spaced apart a distance greater than the width of a member to be engaged thereby and movable bodily about a vertical axis, and a connection between said cable and said means at a point outside of said hook-like portions.

7. A grounding device for electric cables including a member having a hook at one end thereof, a member cooperating therewith and constituting therewith a cooperating hook, and means for connecting a cable thereto and clamping the end of one of the conductors of said cable between said members.

8. In combination with a multi-wire cable, a ground device comprising a member having a hook formed thereon, a cooperating member forming with said first mentioned member a cooperating hook, a third member parallel to said first mentioned members, means for drawing said several members toward each other, said cable passing between said second and third mentioned members, and an end of one of the conductors of said cable, being clamped between said first and second mentioned members.

9. A grounding device for electric cables under tension having oppositely located engaging portions normally spaced apart a distance greater than the width of the member to be engaged thereby and movable bodily about a vertical axis into or out of holding position, and a connection between said cable and said device including a clamp adjustable without varying the distance between said portions.

10. In combination with a cable adapted to be placed under tension, quick connectable means for grounding said cable to a rail comprising a device having oppositely located hook-like portions thereon adapted to engage the opposite bottom flanges of the rail, said device being rotatable bodily about a vertical axis into or out of holding position.

11. In a connector for a multi-wire cable adapted to be placed under tension, means for grounding said cable to a rail comprising a device having oppositely located rail engaging portions and movable bodily about a vertical axis into or out of holding position, and means to clamp said cable to said device and also to clamp one of the conductors thereof to said device.

12. In a connector for a multi-wire cable adapted to be placed under tension, means for grounding said cable to a rail comprising a device having a plurality of members each carrying a rail engaging portion thereon and rotatable bodily with said device to engage said portions on the rail, and an adjustable connection between said cable and said device adjustable to clamp said cable and one of its conductors to said device and to clamp said members together.

13. In a connector for a multi-wire cable adapted to be placed under tension, means for grounding said cable to a rail comprising a device having a plurality of members each carrying a rail engaging hook and rotatable bodily with said device to engage said hooks on the rail, and an adjustable connection comprising clamping means including a supplemental member and adjustable to clamp all of said members together, and said cable between certain of the same and one of its conductors between others of the same.

In testimony whereof I affix my signature.

CHARLES W. WYMAN.

Certificate of Correction.

It is hereby certified that in Letters Patent No. 1,587,461, granted June 1, 1926, upon the application of Charles W. Wyman, of Claremont, New Hampshire, for an improvement in "Mining Apparatus," errors appear in the printed specification requiring correction as follows: Page 1, line 54, for the word "track" read *truck*, and line 95, before the word "end" insert the article *the;* page 2, line 114, claim 8, after the word "cable" strike out the comma; and that the said Letters Patent should be read with these corrections therein that the same may conform to the record of the case in the Patent Office.

Signed and sealed this 20th day of July, A. D. 1926.

[SEAL.]
M. J. MOORE,
*Acting Commissioner of Patents.*